United States Patent
Blythe et al.

(10) Patent No.: US 9,389,702 B2
(45) Date of Patent: Jul. 12, 2016

(54) INPUT ASSOCIATION

(75) Inventors: Michael M. Blythe, Albany, OR (US);
Kenneth L. Anthony, Corvallis, OR (US); Gregory W. Blythe, Philomath, OR (US); Daniel T. Pinard, Corvallis, OR (US); J. Bronwyn Pierce, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2193 days.

(21) Appl. No.: 11/244,576

(22) Filed: Oct. 6, 2005

(65) Prior Publication Data

US 2007/0083820 A1  Apr. 12, 2007

(51) Int. Cl.
*G06F 3/0346* (2013.01)
*G06F 3/01* (2006.01)
*G06F 3/038* (2013.01)

(52) U.S. Cl.
CPC .............. *G06F 3/0346* (2013.01); *G06F 3/017* (2013.01); *G06F 3/038* (2013.01); *G06F 2203/0381* (2013.01)

(58) Field of Classification Search
CPC ..... G06F 3/0481; G06F 3/017; G06F 3/0346; G06F 1/1694; G06F 2200/1637; G06F 1/1626; G06F 3/023; G06F 3/03547; G06F 9/4443; G06F 17/30696; G06F 17/30864; G06F 3/0488

USPC ......... 715/746, 718, 728, 735, 761, 771, 773, 715/778, 863, 970; 463/37, 43
See application file for complete search history.

(56) References Cited

U.S. PATENT DOCUMENTS

| | | | | |
|---|---|---|---|---|
| 5,092,779 | A | * 3/1992 | Piwonka | A63F 9/183 434/352 |
| 5,257,184 | A | 10/1993 | Mushabac | |
| 5,364,108 | A | * 11/1994 | Esnouf | A63F 9/183 273/432 |
| 5,521,324 | A | 5/1996 | Dannenberg | |
| 5,694,150 | A | * 12/1997 | Sigona et al. | 715/856 |
| 6,246,395 | B1 | 6/2001 | Goyins | |
| 6,390,923 | B1 * | 5/2002 | Yoshitomi | A63F 13/00 434/307 R |
| 6,448,486 | B1 * | 9/2002 | Shinsky | G10H 1/0025 84/613 |
| 6,684,062 | B1 * | 1/2004 | Gosior | A63F 13/02 375/346 |
| 6,774,813 | B2 * | 8/2004 | van Ee | G08C 19/28 340/12.23 |

(Continued)

OTHER PUBLICATIONS

Ed Lewis; Eye Toy: Groove—The little camera that Could come Back with a Few new Tricks; Retrieved from the Internet: http:llps2.ign.comlarticles15071507854pl.html. Retrieved on Feb. 22, 2005.*

(Continued)

*Primary Examiner* — Linh K Pham
(74) *Attorney, Agent, or Firm* — Rathe Lindenbaum LLP

(57) ABSTRACT

A plurality of substantially simultaneous inputs are associated with one or more applications, wherein it is determined if the plurality of inputs includes unacceptable inputs and wherein unacceptable inputs are ignored.

18 Claims, 5 Drawing Sheets

(56) References Cited

U.S. PATENT DOCUMENTS

| | | | | |
|---|---|---|---|---|
| 6,864,778 | B2* | 3/2005 | Musschebroeck | G08C 17/02 340/12.52 |
| 6,872,139 | B2* | 3/2005 | Sato | A63F 13/10 463/1 |
| 6,873,344 | B2* | 3/2005 | Samra et al. | 715/723 |
| 6,878,066 | B2* | 4/2005 | Leifer | A63F 13/06 463/36 |
| 6,923,723 | B2* | 8/2005 | Goden | A63F 13/08 105/26.1 |
| 6,948,129 | B1* | 9/2005 | Loghmani | 715/751 |
| 7,024,501 | B1* | 4/2006 | Wright | A63F 13/02 710/14 |
| 7,242,389 | B1* | 7/2007 | Stern | G06Q 10/10 345/158 |
| 7,350,078 | B1* | 3/2008 | Odom | G06F 21/31 713/176 |
| 7,417,185 | B2* | 8/2008 | Ludwig | G10D 1/00 84/377 |
| 7,435,891 | B2* | 10/2008 | Perla | G09B 15/00 434/307 R |
| 7,570,770 | B2* | 8/2009 | Kohno | G11B 27/034 369/4 |
| 7,641,552 | B2* | 1/2010 | Manz | G07F 17/32 463/19 |
| 2001/0029202 | A1* | 10/2001 | Kondo | A63F 13/10 463/31 |
| 2002/0004420 | A1* | 1/2002 | Suga | A63F 13/10 463/7 |
| 2002/0013166 | A1* | 1/2002 | Yoshitomi | G10H 1/0008 463/7 |
| 2002/0025842 | A1* | 2/2002 | Nobe | A63F 13/10 463/7 |
| 2002/0088337 | A1* | 7/2002 | Devecka | A63F 13/005 84/743 |
| 2002/0093491 | A1* | 7/2002 | Gillespie | G06F 3/03547 345/173 |
| 2002/0147740 | A1* | 10/2002 | Faraday et al. | 707/500 |
| 2002/0169014 | A1* | 11/2002 | Egozy | A63F 13/12 463/7 |
| 2002/0175948 | A1* | 11/2002 | Nielsen | G06F 3/033 715/781 |
| 2004/0201544 | A1* | 10/2004 | Love | G06F 3/1454 345/1.1 |
| 2004/0224765 | A1* | 11/2004 | Martinez | A63F 13/02 463/37 |
| 2005/0020225 | A1* | 1/2005 | Lazzarotto | G06F 3/0231 455/226.1 |
| 2005/0202871 | A1* | 9/2005 | Lippincott | 463/39 |
| 2005/0255900 | A1* | 11/2005 | Takahashi | A63F 13/10 463/3 |
| 2006/0033701 | A1* | 2/2006 | Wilson | G06F 1/1616 345/156 |
| 2006/0040717 | A1* | 2/2006 | Lind | G07F 17/3295 463/7 |
| 2006/0053372 | A1* | 3/2006 | Adkins | G09B 7/02 715/709 |
| 2006/0058101 | A1* | 3/2006 | Rigopulos | A63F 13/10 463/35 |
| 2006/0094512 | A1* | 5/2006 | Yoshino | A63F 13/00 463/47 |
| 2006/0112335 | A1* | 5/2006 | Hofmeister et al. | 715/701 |
| 2006/0135262 | A1* | 6/2006 | Kennedy | G07F 17/32 463/42 |
| 2006/0174202 | A1* | 8/2006 | Bonner | G06F 9/4443 715/750 |
| 2006/0179411 | A1* | 8/2006 | Wolf et al. | 715/751 |
| 2006/0205517 | A1* | 9/2006 | Malabuyo | G06F 9/4443 463/43 |
| 2006/0211497 | A1* | 9/2006 | Manz | 463/37 |
| 2006/0287027 | A1* | 12/2006 | Hardisty | A63F 13/10 463/8 |
| 2007/0016876 | A1* | 1/2007 | Schultz | G06F 9/4443 715/802 |
| 2007/0032281 | A1* | 2/2007 | Nakatsuka | A63F 13/10 463/7 |
| 2007/0079690 | A1* | 4/2007 | Chiwata | 84/609 |
| 2007/0083820 | A1* | 4/2007 | Blythe | G06F 3/017 715/781 |
| 2009/0019188 | A1* | 1/2009 | Mattice | G06F 3/0421 710/17 |

OTHER PUBLICATIONS

Dietz, DiamondTouch, Mitsubishi Electric Research Laboratories, Aug. 3, 2005, http://www.merl.com/projects/DiamondTouch/.

* cited by examiner

_US 9,389,702 B2_

INPUT ASSOCIATION

BACKGROUND

Typical graphical user interfaces (GUIs) serially process input signals that are received from input devices such as a mouse or a keyboard. Serial processing of inputs to a multi-user GUI may, however, provide an inappropriate result. For instance, if two users provide inputs to a GUI, the GUI may process the first input that is directed at an active window, without regard for the other input. Accordingly, current GUI implementations may provide inappropriate results when dealing with multiple inputs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Various embodiments for associating multiple inputs with one or more applications are described. The inputs may be directed at a graphical user interface (GUI) during time periods with some overlap or time periods occurring relatively close in time, e.g., within a few seconds (e.g., in case of users with disabilities) or milliseconds of each other, or within other suitable and/or configurable time period(s). Hence, the inputs may be directed at the GUI substantially simultaneously in one embodiment.

In one embodiment, an operating system and/or application programs (such as those discussed with reference to FIGS. 3 and 5) may ignore one or more inputs that have an incorrect style. The style may be any suitable input such as a single click (including a left and/or right click), a double click, a gesture, and/or a drag. Each style may correspond to an application that is intended to receive the input (e.g., based on the location of that application on the screen). For example, for a paint program, a drag may be treated as a paint brush; whereas, a drag may be a slashing sword for another application (such as a game).

Multi-Modal Interface

Figure 1:
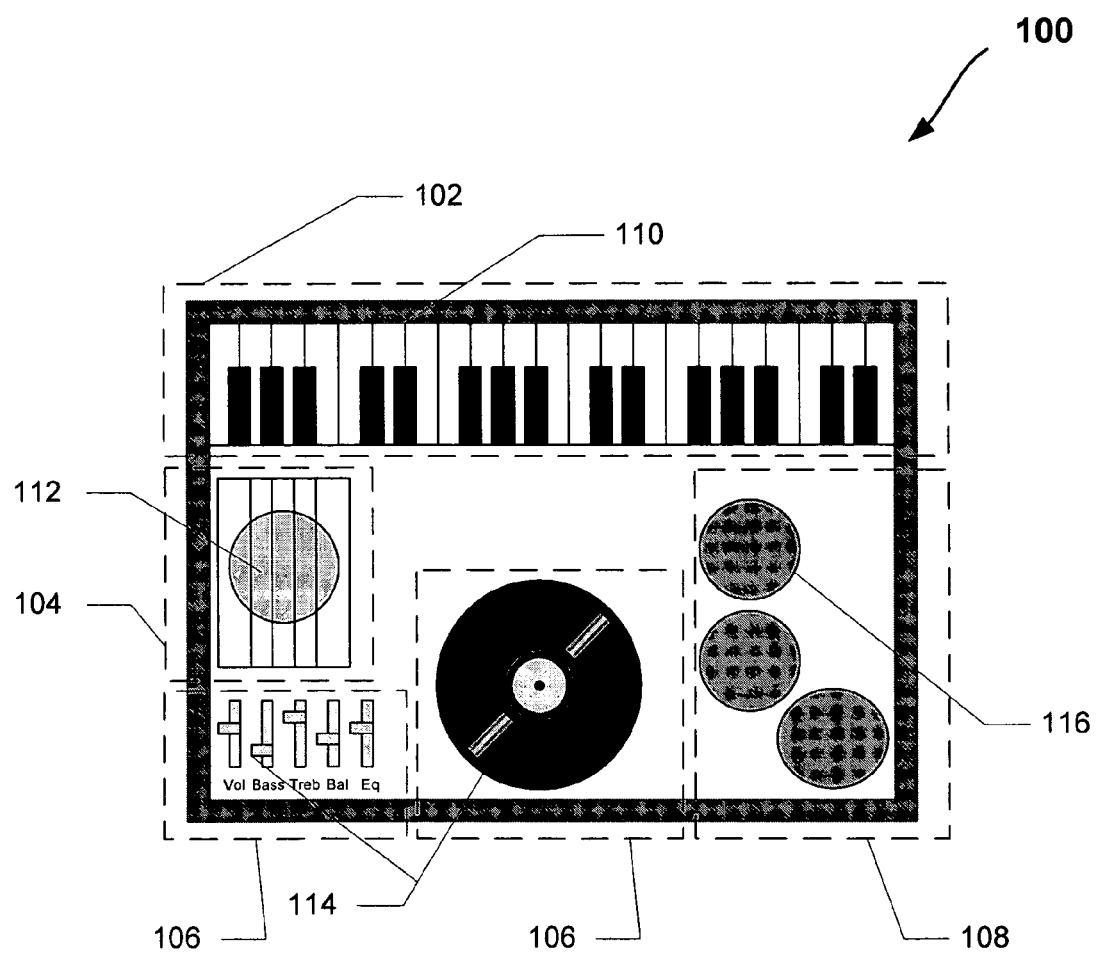
FIG. 1 illustrates an embodiment of a multi-modal application interface, according to an embodiment.

FIG. 1 illustrates an embodiment of a multi-modal application interface 100, according to an embodiment. In one embodiment, the interface 100 is a GUI that is provided by a computing device, such as the computing device 500 discussed with reference to FIG. 5. Hence, the interface 100 may be projected by a display device, such as the display 520 of FIG. 5. It is envisioned that multiple display devices may also be utilized, e.g., one for each user.

As illustrated in FIG. 1, the interface 100 may include a plurality of GUIs (102-108) for a multi-player band. For example, a first user may utilize the GUI 102 (e.g., with click-like inputs, with varying degrees of pressure and/or contact time to play a piano 110). Examples of input devices that may be used to provide varying degrees of pressure include a touch-sensitive pad, a stylus, or the like. A second user may utilize the GUI 104 (e.g., with drag-like and click-like inputs) to play a guitar 112. A third user may utilize the GUI 106 (e.g., by drag-like input) to adjust various sound controls, for example, by scratching a turntable 114. And, a fourth user may utilize the GUI 108 (e.g., by mouse-like click inputs with varying degrees of pressure) to play the drums 116. It is also envisioned that a single user may provide inputs to one or more of the GUIs 102-108, e.g., to play one or more of the instruments simulated (110-116). Some are all of these inputs may occur during time periods that are at least partially concurrent as explained previously.

As will be further discussed with reference to FIGS. 2-4, multiple inputs received by the interface 100 may be associated with one or more applications. Accordingly, it is envisioned that a single application may provide one or more GUIs (102-108) with which one or more users may interact. Also, multiple applications may provide the GUIs (102-108), for example, where each user may interact with one or more applications.

Furthermore, the inputs to the interface 100 may be provided by any suitable input device including a pointing device (e.g., a mouse and/or stylus), a key-based input device (e.g., a keyboard), a touch input (e.g., a user touch for a touch screen device), an object (e.g., a token, game piece, and the like), a camera, and the like.

Exemplary Input Recognition System

Figure 2:
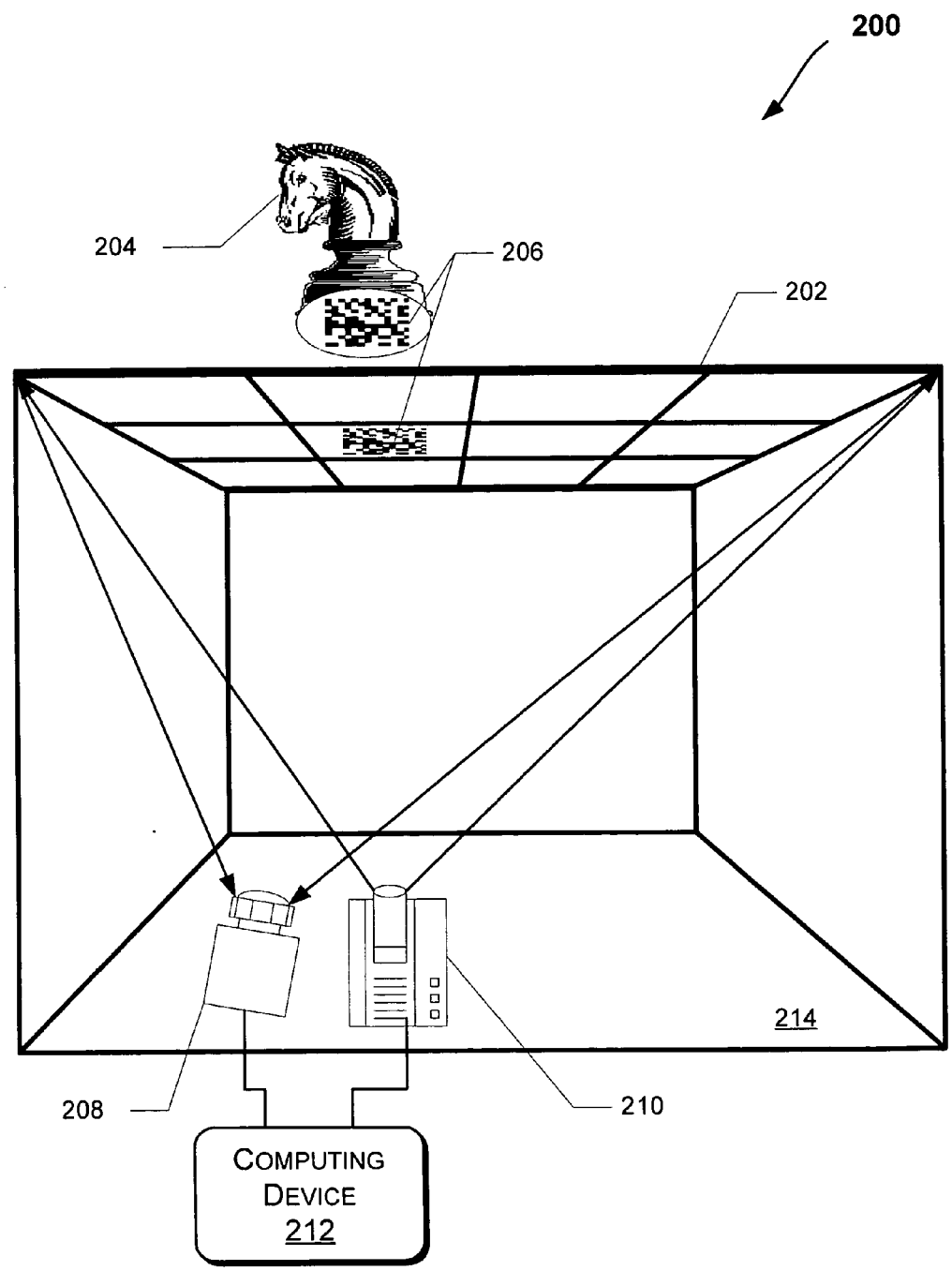
FIG. 2 illustrates an embodiment of an input recognition system, according to an embodiment.

FIG. 2 illustrates an embodiment of an input recognition system 200, according to an embodiment. The system 200 includes a surface 202 which may be positioned horizontally. The surface 202 may also be tilted for viewing from the sides, for example. The system 200 recognizes inputs provided by any suitable input device such as those discussed with reference to FIG. 1.

For illustrative purposes, an object 204 that is placed on the surface 202 may be utilized as the input device. Accordingly, when discussing the object 204, it is envisioned that any other suitable input device such as those discussed with reference to FIG. 1 may be utilized in place of the object 204. The object 204 may be any suitable type of an object capable of being recognized such as a token, a game piece, and the like. The object 204 may know how it should be treated by the system 200. For example, the object 204 may store data regarding the object's configuration. This data may then be transmitted to the system 200, as will be further discussed herein, for example, via radio frequency, infrared, optically, and other types of suitable transmission medium. Also, the system 200 may recognize the object 204 according to its shape, movement, and the like.

In one embodiment, the object 204 may have a symbology 206 attached to a side of object 204, such as its bottom that faces the surface 202 such that when the object is placed on the surface 202, a camera 208 may capture an image of the symbology 206. Hence, the surface 202 may be any suitable type of a translucent or semi-translucent surface (such as a projector screen) capable of supporting the object 204, while allowing electromagnetic waves to pass through the surface 202 (e.g., to enable recognition of the symbology 206 from the bottom side of the surface 202). The camera 208 may be any suitable type of capture device such as a charge-coupled device (CCD) sensor, a complementary metal oxide semiconductor (CMOS) sensor, a contact image sensor (CIS), and the like.

Furthermore, the symbology 206 may be any suitable type of a machine-readable symbology such as a printed label (e.g., a label printed on a laser printer, an inkjet printer, and the like), infrared (IR) reflective label, ultraviolet (UV) reflective label, and the like. By using a UV or IR illumination source (not shown) to illuminate the surface 202 from the bottom side, UV/IR filters (e.g., placed in between the illumination source and a capture device (e.g., 208 in one embodiment)), and an UV/IR sensitive camera (e.g., 208), objects (e.g., 204) on the surface 202 may be detected without utilizing relatively complex image math. For example, when utilizing IR, tracking the IR reflection may be used for object detection, without applying image subtraction that is further discussed herein with reference to FIG. 3. It is envisioned that the illumination source may also be located on top of the surface 202. Moreover, the symbology 206 may be a bar code, whether one dimensional, two dimensional, or three dimensional.

In one embodiment, the system 200 determines that changes have occurred with respect to the surface 202 (e.g., the object 204 is placed or moved) by comparing a newly captured image with a reference image that may have been captured at a reference time (e.g., when no objects were present on the surface 202). In addition to the UV and/or IR techniques discussed herein, it is also envisioned that visible light may be utilized to capture the images for the image comparison, e.g., to enable a camera to be utilized as an input device.

The system 200 also includes a projector 210 to project images onto the surface 202, e.g., to provide feedback to the one or more users viewing the surface 202 and/or to provide one or more GUIs (such as 100-108 of FIG. 1). Accordingly, a user viewing the surface 202 may see one or more projected images. The camera 208 and the projector 210 are coupled to a computing device 212. As will be further discussed with respect to FIG. 3, the computing device 212 may control the camera 208 and/or the projector 210, e.g., to capture images of the surface 202 and project images onto the surface 202.

Additionally, as illustrated in FIG. 2, the surface 202, camera 208, and projector 210 may be part of an enclosure (214), e.g., to protect the parts from physical elements (such as dust, liquids, and the like) and/or to provide a sufficiently controlled environment for the camera 208 to be able to capture accurate images and/or for the projector to project brighter images. Also, it is envisioned that the computing device 212 (such as a laptop) may be provided wholly or partially inside the enclosure 214, or wholly external to the enclosure 214.

Figure 3:
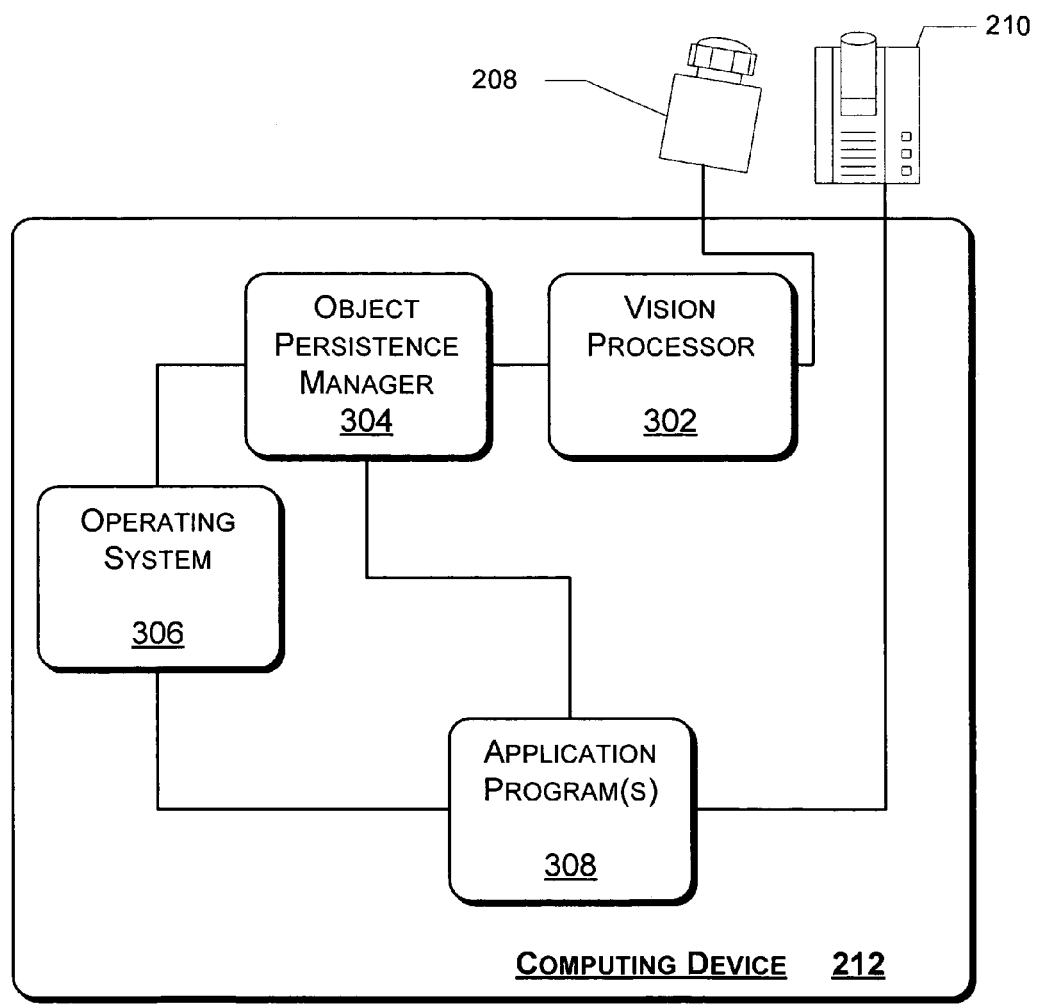
FIG. 3 illustrates exemplary portions of the computing device 212 of FIG. 2, according to an embodiment.

FIG. 3 illustrates exemplary portions of the computing device 212 of FIG. 2, according to an embodiment. In an embodiment, the computing device 212 may be a general computing device such as 500 discussed with reference to FIG. 5. The computing device 212 includes an embodiment of a processor, such as a vision processor 302, coupled to the camera 208 to determine when a change to objects (e.g., 204) or other inputs provided on the surface 202 occurs. Examples of such changes include a change in the number, position, and/or direction of the objects or other inputs.

In an embodiment, the vision processor 302 may perform an image comparison between a reference image of the bottom side of the surface (202) and a subsequent image to recognize that whether one or more inputs have been provided (e.g., the symbology (206) has changed in position or orientation). Accordingly, the vision processor 302 may perform a frame-to-frame image subtraction to obtain the change or delta of the surface (202).

The vision processor 302 is coupled to an object persistence manager (OPM) 304 which receives the data regarding the changes on the surface 202 to determine the input and/or input type (e.g., single click (including a left and/or right click), double click, gesture, and/or drag). The object persistence manager 304 is coupled to an operating system (O/S) 306 and one or more application programs 308. The object persistence manager 304 may communicate the inputs provided to the surface 202 to one or more of the O/S 306 and/or application programs 308.

In one embodiment, the object persistence manager 304 determines whether an application program (308) is to receive a given input. For example, the object persistence manager 304 may have access to stored data (e.g., data stored in a memory 508 discussed with reference to FIG. 5) that indicates which regions (e.g., as defined by coordinates of a display surface, such as the surface 202) are associated with one or more applications (e.g., applications 308 of FIG. 3). Hence, the persistence manager 304 may direct the input (from the surface 202) to one or more applications (308) based on the regions where given GUIs associated with the applications (308) are projected.

Furthermore, in an embodiment, application programs 308 may register their desired operation modality with the OPM 304. For example, a checkers game may make use of 2D symbology recognition of stationary tokens in a region A. A separate drawing application may register for a planned use of fast moving stylus point recognition in region B, e.g., separate from A. Yet another application may register a planned use for fingertip detection across the entire display surface, e.g., inclusive of regions A and B.

Based on the current client applications' registered planned usages, the OPM 304 may classify signals received from the vision processor 302. For example, a checker detected in region A which has moved slightly may not constitute a new signal to the checkers application, nor would it be of interest to the other applications. In this case, the threshold for a significant position change may be based, e.g., on total shift over the last 50 data points, perhaps 2 per second. For stylus movement in region B, changes may be reported to the drawing application every cycle, e.g., perhaps 100 per second to properly account for the stylus movement. Fingertip detection in region A or B would not be sent to the checkers or drawing applications but may be sent to the other application.

Furthermore, the OPM 304 may provide information to the vision processor 302 to allow it to adjust its detection algorithms to enhance performance. For example, if no applications (308) are expecting 2D symbology, the vision processor 302 may lower the inspection frequency for these. In the situation described above, the vision processor 302 may lower the frequency of decoding 2D symbology to devote greater processing power to track the fast moving stylus. The OPM 304 may also instruct the vision processor 302 to adjust its operations based on previously acquired inputs. For instance, if the vision processor 302 is reporting fingertip detections of consistent size, shape, color, orientation, etc., then the OPM 304 may instruct the vision processor 302 to adjust its parameters to adjust detection of that particular fingertip to enhance performance. If an unknown input is reported, the OPM 304 may instruct the vision processor 302 to widen its search parameters, or to check for specific patterns to identify the input.

Additionally, the application program(s) 308 may utilize the input information to cause the projector 210 to project a desired image. For example, if a knight (204) is placed on the surface 202, the application is informed of its identification (ID), e.g., by reading the symbology 206. If the user places a finger on the knight, the symbology is changed either electrically (via the static charge on a hand or mechanically via a button that is pressed by the player), and the projector 210 may project an image to indicate possible, legal moves the knight is authorized to make on the surface 202.

Associating Inputs with Applications

Figure 4:
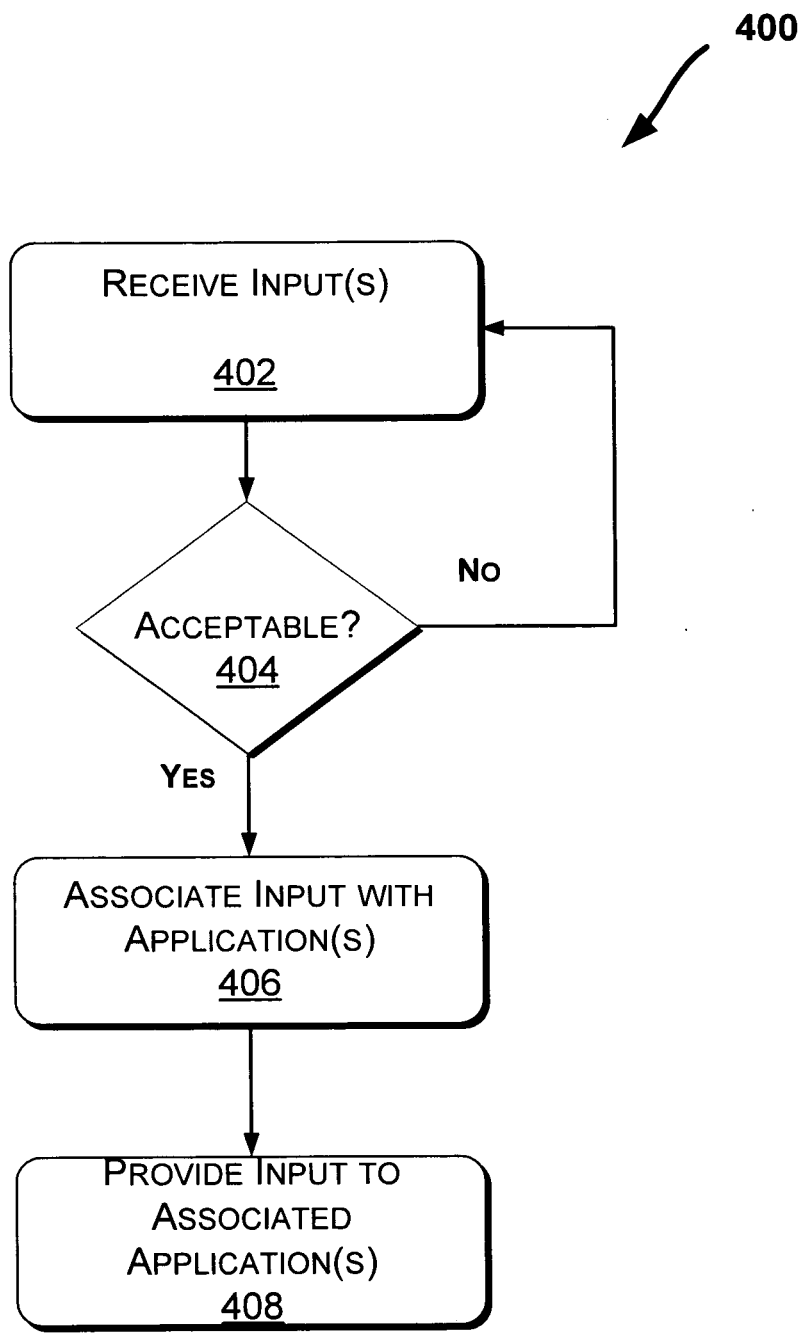
FIG. 4 illustrates an embodiment of a method of associating multiple inputs with one or more applications, according to an embodiment.

FIG. 4 illustrates an embodiment of a method 400 of associating multiple inputs with one or more applications, according to an embodiment. In an embodiment, the system of FIG. 2 (and FIG. 3) can be utilized to perform the method 400. Also, the method 400 may be utilized in conjunction with the interface 100 of FIG. 1.

As discussed with reference to FIGS. 1-3, one or more inputs may be received (402). The inputs may be directed at one or more GUIs and may be received during time periods having some overlap or time periods occurring relatively close in time from one or more users (see, e.g., the discussion of FIG. 1). Also, the inputs may be provided using one or more input devices including a camera, a pointing device, a key-based input device, a touch input, and an object, as discussed with reference to FIG. 1. Each input may have a style such as a single click, a double click, a gesture, and/or a drag. The GUI may include one or more windows, where at least one of the windows is active (e.g., for each user).

After receiving one or more inputs (402), it is determined whether the inputs are acceptable (404). For example, as discussed with reference to FIG. 3, the object persistence manager 304 may determine whether a given input is directed to one or more applications (308) based on input style and the regions where given GUIs associated with the applications are projected. Moreover, applications may have one or more input styles that are acceptable for a given region of a GUI. Hence, the received inputs (402) are associated with one or more applications (406) such as discussed with reference to FIG. 3. Otherwise, if the received inputs are unacceptable (404), they may be ignored, e.g., when the inputs fail to occur in one or more acceptable areas such as discussed with reference to FIG. 3.

Once an application association is determined (406) for an acceptable input, the input is provided to the associated application (408) such as discussed with reference to FIG. 3. Furthermore, each input may have a style corresponding to an application for which the input is intended, as discussed with reference to FIGS. 1-3.

Exemplary Computing Environment

Figure 5:
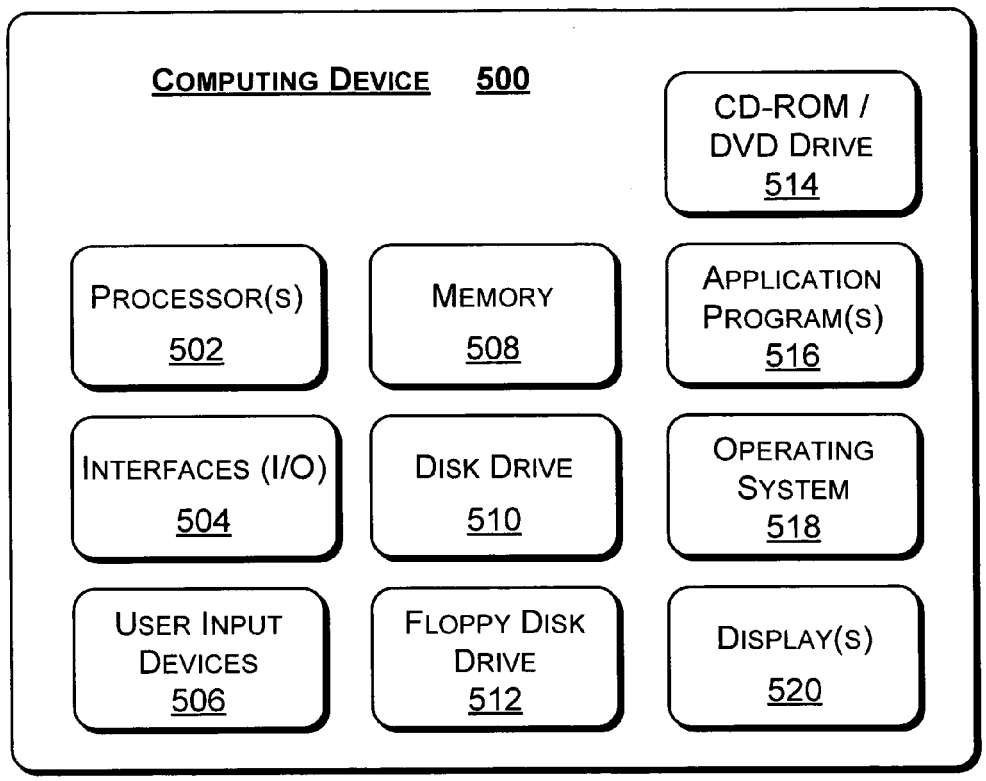
FIG. 5 illustrates various components of an embodiment of a computing device which may be utilized to implement portions of the techniques discussed herein, according to an embodiment.

FIG. 5 illustrates various components of an embodiment of a computing device 500 which may be utilized to implement portions of the techniques discussed herein. In one embodiment, the computing device 500 can be used to perform the method of FIG. 4. The computing device 500 may also be used to provide access to and/or control of the systems 200 and 300 of FIGS. 2 and 3, respectively. The computing device 500 may further be used to manipulate, enhance, and/or store the inputs discussed herein.

The computing device 500 includes one or more processor(s) 502 (e.g., microprocessors, controllers, etc.), input/output interfaces 504 for the input and/or output of data, and user input devices 506. The processor(s) 502 process various instructions to control the operation of the computing device 500, while the input/output interfaces 504 provide a mechanism for the computing device 500 to communicate with other electronic and computing devices. The user input devices 506 can include a keyboard, touch screen, mouse, pointing device, a camera (e.g., that compares one or more captured images to determine an input such as discussed with reference to FIGS. 2-3, for example), and/or other mechanisms to interact with, and to input information to the computing device 500.

The computing device 500 may also include a memory 508 (such as read-only memory (ROM) and/or random-access memory (RAM)), a disk drive 510, a floppy disk drive 512, and a compact disk read-only memory (CD-ROM) and/or digital video disk (DVD) drive 514, which may provide data storage mechanisms for the computing device 500.

The computing device 500 also includes one or more application program(s) 516 and an operating system 518 which can be stored in non-volatile memory (e.g., the memory 508) and executed on the processor(s) 502 to provide a runtime environment in which the application program(s) 516 can run or execute. The computing device 500 can also include one or more display(s) 520, such as a cathode ray tube (CRT), a liquid crystal display (LCD), a digital light projector (DLP), a plasma display, and the like. Also, the display 520 may be an integrated display device such as for a PDA, a portable computing device, and any other mobile computing device.

Select embodiments discussed herein (such as those discussed with reference to FIG. 4) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or machine-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
presenting a display to a first user, the display presented to the first user having a first active graphical user interface at a first region of the display and a second active graphical user interface at a second region of the display;
presenting the display to a second user, the display presented to the second user being identical to the display presented to the first user, the display presented to the second user having the first active graphical user interface at the first region of the display and the second active graphical user interface at the second region of the display, wherein the first active graphical user interface is assigned to a first input style and wherein the second active graphical user interface is assigned to a second input style different than the first input style and wherein the first user and the second user each provide either of the first input style or the second input style to the first graphical user interface;
concurrently receiving, with the first active graphical user interface, a first input from the first user and a second input from the second user;
identifying a style of the first input to determine if the first input is the first input style assigned to the first active graphical user interface;
in response to a determination that the first input is the second input style, ignoring the first input;
identifying a style of the second input to determine if the second input is the first input style assigned to the first active graphical user interface; and
in response to a determination that the second input is the second input style, ignoring the second input.

2. The method of claim 1, further comprising: in response to a determination that the first input is the first input style providing the first input to one or more applications associated with the first active graphical user interface.

3. The method of claim 1, wherein the first input style is a style selected from a group comprising a single click, a double click, a gesture, and a drag and wherein the second input style is a style different than the first input style and selected from a group comprising a single click, a double click, a gesture, and a drag.

4. The method of claim 1, wherein the first input and the second input are provided using one or more input devices selected from a group comprising a pointing device, a key-based input device, a touch input, a camera, and an object.

5. The method of claim 1, wherein the display comprises a plurality of windows, the plurality windows comprising a first window comprising the first active graphical user interface and a second window comprising the second active graphical user interface.

6. The method of claim 1, wherein the display comprises a plurality of windows and at least one of the plurality of windows is active.

7. The method of claim 1, wherein the display comprises a plurality of windows and wherein at least one window is active for each user.

8. A system comprising:
at least one display device to simultaneously present a display that includes a first graphical user interface and a second graphical user interface to a first user and a second user, the display presented to the first user being identical to the display presented to the second user, wherein the first graphical user interface is assigned to a first input style and wherein the second graphical user interface is assigned to a second input style different than the first input style and wherein the first user and the second user may each provide either of the first input style or the second input style to the first graphical user interface; and
a computing device configured to:
concurrently receive, with the first graphical user interface, a first input from the first user and a second input from the second user;
identify a style of the first input to determine if the first input is the first input style assigned to the first graphical user interface;
in response to a determination that the first input is the second input style, ignoring the first input;
identify a style of the second input to determine if the second input is the first input style assigned to the first graphical user interface; and
in response to a determination that the second input is the second input style, ignoring the second input.

9. The system of claim 8, wherein the first input style is a style selected from a group comprising a single click, a double click, a gesture, and a drag and wherein the second input style is a style different than the first input style and selected from a group comprising a single click, a double click, a gesture, and a drag a style selected from a group comprising a single click, a double click, a gesture, and a drag.

10. The system of claim 8, further comprising: the at least two input devices, wherein the at least two input devices are selected from a group comprising a pointing device, a key-based input device, a touch input, a camera, and an object.

11. The system of claim 8, wherein the display comprises a plurality of displays.

12. The system as recited in claim 8, further comprising: an image capture device configured to capture one or more images corresponding to the first input and the second input.

13. The system as recited in claim 8, wherein: the computing device includes a vision processing device configured to execute instructions to determine occurrence of the first input and the second input the using the one or more images; and the computing device includes a processing device configured to execute instructions to associate the first input and the second input with the one or more applications.

14. The system as recited in claim 13, wherein: the processing device includes a configuration to execute instructions to adjust operation of the vision processing device according to a type of the at least two input devices used to provide the first input and the second input.

15. A non-transitory computer-readable medium comprising:
stored instructions to assign a first input style to a first graphical user interface and a second input style, different than the first input style, to a second graphical user interface;
stored instructions to simultaneously present a display to a first user and a second user, the display presented to the first user being identical to the display presented to the second user, the display comprising the first graphical user interface and the second graphical user interface;
stored instructions to:
concurrently receive, with the first active graphical user interface, a first input from the first user and a second input from the second user;
identify a style of the first input to determine if the first input is the first input style assigned to the first active graphical user interface;
in response to a determination that the first input is the second input style, ignore the first input;

identify a style of the second input to determine if the second input is the first input style assigned to the first active graphical user interface; and in response to a determination that the second input is the second input style, ignore the second input.

16. The non-transitory computer-readable medium of claim 15, further comprising stored instructions that in response to a determination that the first input is the first input style providing the first input to one or more applications associated with the first active graphical user interface.

17. A method comprising:

presenting a display to a first user, the display presented to the first user having a first active graphical user interface at a first region of the display and a second active graphical user interface at a second region of the display;

presenting the display to a second user, the display presented to the second user being identical to the display presented to the first user, the display presented to the second user having the first active graphical user interface at the first region of the display and the second active graphical user interface at the second region of the display, wherein the first active graphical user interface is assigned to a first input style and wherein the second active graphical user interface is assigned to a second input style different than the first input style and wherein the first user and the second user may each provide either of the first input style or the second input style to the first graphical user interface;

concurrently receiving, with the first active graphical user interface, a first input from the first user and a second input from the second user;

identifying a style of the first input to determine if the first input is the first input style assigned to the first active graphical user interface;

in response to a determination that the first input is the second input style, ignoring the first input;

identifying a style of the second input to determine if the second input is the first input style assigned to the first active graphical user interface; and in response to a determination that the second input is the second input style, ignoring the second input.

18. The method of claim 17, further comprising detecting the first input and the second input.

\* \* \* \* \*